US010634080B2

(12) United States Patent
Graus et al.

(10) Patent No.: US 10,634,080 B2
(45) Date of Patent: Apr. 28, 2020

(54) ARRANGEMENT WITH ROTATING DRIVE MACHINE AND OPERATING METHOD

(71) Applicant: INNIO Jenbacher GmbH & Co OG, Jenbach (AT)

(72) Inventors: Mario Graus, Mils (AT); Francisco Lopez, Innsbruck (AT); Herbert Schaumberger, Muenster (AT); Nikolaus Spyra, Innsbruck (AT); Johann Hirzinger-Unterrainer, Koessen (AT)

(73) Assignee: INNIO JENBACHER GMBH & CO OG, Jenbach (AT)

( * ) Notice: Subject to any disclaimer, the term of this patent is extended or adjusted under 35 U.S.C. 154(b) by 508 days.

(21) Appl. No.: 15/002,783

(22) Filed: Jan. 21, 2016

(65) Prior Publication Data
US 2016/0215720 A1    Jul. 28, 2016

(30) Foreign Application Priority Data

Jan. 23, 2015 (AT) .................................... A 29/2015

(51) Int. Cl.
*F02D 41/10*     (2006.01)
*F02D 41/14*     (2006.01)
(Continued)

(52) U.S. Cl.
CPC ............ *F02D 41/107* (2013.01); *F02B 53/12* (2013.01); *F02B 53/14* (2013.01); *F02D 29/06* (2013.01);
(Continued)

(58) Field of Classification Search
CPC .......... F02D 2041/1432; F02D 41/107; F02D 41/007; F02D 41/3005; F02D 41/14;
(Continued)

(56) References Cited

U.S. PATENT DOCUMENTS 3,406,666 A   10/1968   Steiger
5,058,625 A   10/1991   Kaiser et al.
(Continued)

FOREIGN PATENT DOCUMENTS

DE    10253739 B3    5/2004
EP    0 903 469      3/1999
(Continued)

OTHER PUBLICATIONS

Extended European Search Report dated Jun. 3, 2016 in corresponding European Application No. 16 00 0107, with English translation.
(Continued)

*Primary Examiner* — George C Jin
(74) *Attorney, Agent, or Firm* — Fletcher Yoder, P.C.

(57) ABSTRACT

A method of operating an arrangement includes using a rotating drive machine, wherein a value characteristic of a change of a power output of the arrangement is provided by measuring at least one parameter and/or calculation. The rotating drive machine is open and/or closed loop controlled depending on the value characteristic of the change of the power output of the arrangement and/or a load of the rotating drive machine is changed depending on the value characteristic of the change of the power output of the arrangement, such that the change of the power output of the arrangement is substantially compensated.

20 Claims, 3 Drawing Sheets

Figure 1:
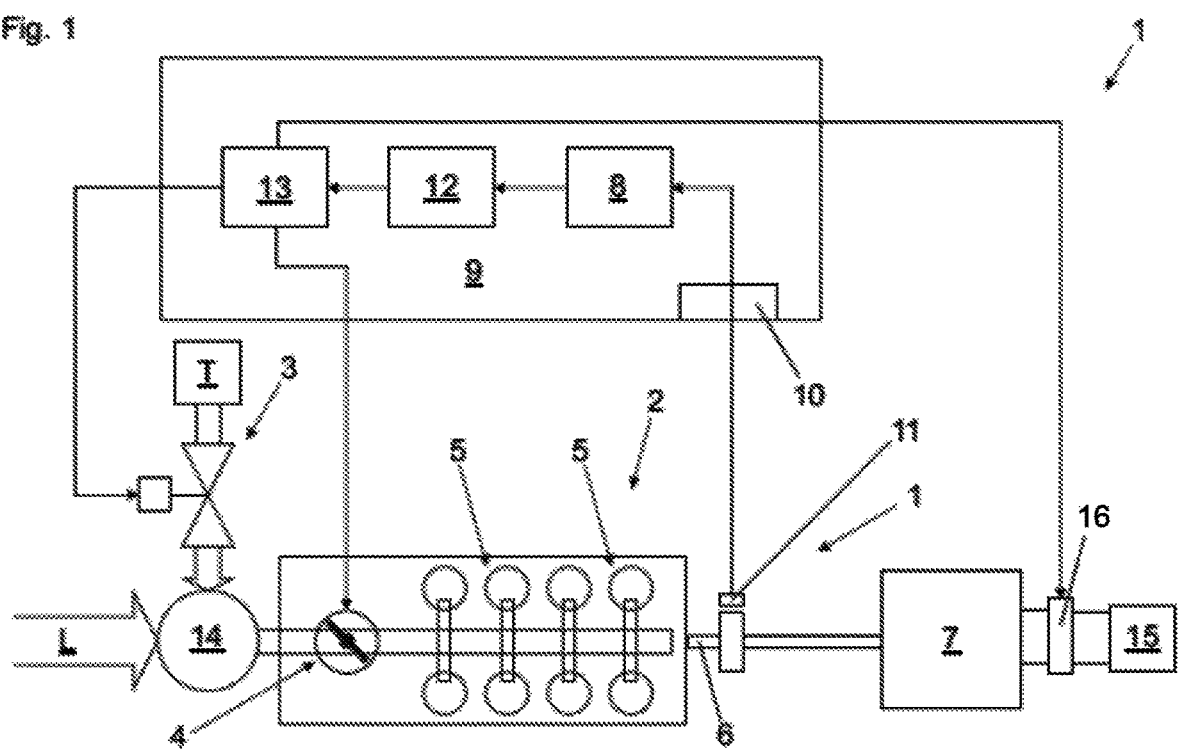

(51) Int. Cl.
| | |
|---|---|
| *F02D 29/06* | (2006.01) |
| *H02P 9/04* | (2006.01) |
| *F02D 41/02* | (2006.01) |
| *F02M 21/02* | (2006.01) |
| *F02B 53/12* | (2006.01) |
| *F02B 53/14* | (2006.01) |
| *F02D 41/00* | (2006.01) |
| *F02D 41/30* | (2006.01) |
| *F02P 9/00* | (2006.01) |
| *H02P 101/25* | (2016.01) |
| *F02D 19/02* | (2006.01) |
| *F02B 37/16* | (2006.01) |
| *F02B 37/18* | (2006.01) |
| *F02B 53/02* | (2006.01) |
| *F02B 53/10* | (2006.01) |

(52) U.S. Cl.
CPC ....... *F02D 41/0007* (2013.01); *F02D 41/021* (2013.01); *F02D 41/0205* (2013.01); *F02D 41/14* (2013.01); *F02D 41/3005* (2013.01); *F02M 21/02* (2013.01); *F02P 9/002* (2013.01); *H02P 9/04* (2013.01); *F02B 37/16* (2013.01); *F02B 37/18* (2013.01); *F02B 53/02* (2013.01); *F02B 53/10* (2013.01); *F02D 19/023* (2013.01); *F02D 2041/1433* (2013.01); *F02D 2200/101* (2013.01); *F02D 2200/1012* (2013.01); *F02D 2250/21* (2013.01); *H02P 2101/25* (2015.01); *Y02T 10/144* (2013.01); *Y02T 10/32* (2013.01)

(58) Field of Classification Search
CPC .. F02D 41/0027; F02D 41/1401; F02D 19/02; F02D 19/023; F02D 31/001; F02D 31/007; F02B 53/02; F02B 53/10; F02B 53/12; F02B 53/14; F02P 9/002; F02P 9/005; H02P 9/04; H02P 9/102; H02P 9/008; H02P 9/10; H02P 2101/45
USPC ........................................................ 290/40 B
See application file for complete search history.

(56) References Cited

U.S. PATENT DOCUMENTS

| | | | |
|---|---|---|---|
| 5,752,489 A | 5/1998 | Henderson et al. | |
| 6,112,765 A | 9/2000 | Boyer | |
| 6,196,189 B1 | 3/2001 | Baldwin et al. | |
| 6,216,437 B1 | 4/2001 | Hepner et al. | |
| 6,371,081 B1* | 4/2002 | Hawkins | F02D 31/007 123/339.14 |
| 6,606,496 B1 | 8/2003 | Salvarani et al. | |
| 6,728,625 B2 | 4/2004 | Strubhar et al. | |
| 6,876,097 B2 | 4/2005 | Thomas et al. | |
| 7,069,904 B2* | 7/2006 | Dolker | F02D 31/001 123/352 |
| 7,277,788 B2 | 10/2007 | Boley et al. | |
| 7,343,895 B2 | 3/2008 | Randall | |
| 7,499,842 B2 | 3/2009 | Grichnik et al. | |
| 7,650,222 B2 | 1/2010 | Shiraishi et al. | |
| 7,650,223 B2 | 1/2010 | Shiraishi et al. | |
| 7,747,378 B2 | 6/2010 | Shiraishi et al. | |
| 8,253,268 B1* | 8/2012 | Smith | F03D 1/025 290/55 |
| 2004/0266285 A1* | 12/2004 | Kanno | F02B 61/045 440/84 |
| 2005/0253394 A1* | 11/2005 | Dolker | F02D 31/007 290/30 A |
| 2007/0057512 A1 | 3/2007 | Zook | |
| 2007/0095063 A1* | 5/2007 | Mischler | F02B 39/16 60/608 |
| 2009/0192698 A1 | 7/2009 | Smuda et al. | |
| 2009/0261599 A1 | 10/2009 | Alston et al. | |
| 2011/0175372 A1* | 7/2011 | Eaton | F02D 29/06 290/40 B |
| 2012/0073550 A1 | 3/2012 | Oprea | |
| 2012/0175876 A1* | 7/2012 | Pendray | F02D 19/02 290/41 |
| 2013/0325234 A1* | 12/2013 | Shibata | B60W 10/06 701/22 |
| 2014/0015257 A1 | 1/2014 | Dobbs | |
| 2014/0217746 A1 | 8/2014 | Moser et al. | |

FOREIGN PATENT DOCUMENTS

| | | |
|---|---|---|
| EP | 0 903 469 A1 | 3/1999 |
| EP | 974745 B1 | 7/2005 |
| EP | 2 112 761 | 10/2009 |
| EP | 2 112 761 A2 | 10/2009 |
| EP | 2199580 A1 | 6/2010 |
| EP | 1756410 B1 | 3/2011 |
| EP | 2379865 A1 | 10/2011 |
| EP | 2526279 A1 | 11/2012 |
| EP | 2678545 A1 | 1/2014 |
| GB | 2412751 A | 10/2005 |
| JP | 59190452 A | 10/1984 |
| JP | 0874591 A | 3/1996 |
| JP | 2000087778 A | 3/2000 |
| JP | 2007120382 A | 5/2007 |
| JP | 2010276011 A | 12/2010 |
| WO | 2006086064 A1 | 8/2006 |
| WO | 2009109702 A1 | 9/2009 |
| WO | 2010/134994 | 11/2010 |
| WO | 2010130872 A1 | 11/2010 |
| WO | 2011027024 A1 | 3/2011 |
| WO | 2012/135258 | 10/2012 |
| WO | 2012/135258 A2 | 10/2012 |
| WO | 2013164946 A1 | 11/2013 |
| WO | 2014/167177 | 10/2014 |

OTHER PUBLICATIONS

Ryan et al., A Power-Mapping Variable Speed Control Technique for a Constant-Frequency Conversion System Powered by a IC Engine and PM Generator, 2000, pp. 2376-2382.

Office Action issued in connection with corresponding JP Application No. 2016008388 dated Dec. 20, 2016.

Austrian Search Report dated Dec. 22, 2015 in corresponding Austrian Patent Application No. 29/2015 (with English translation).

Ryan, M.J. and Lorenz, R.D., "A "power-mapping" variable-speed control technique for a constant-frequency mnversion system powered by a IC engine and PM generator," Conference Record of the 2000 IEEE Industry Applications Conference. Thirty-Fifth IAS Annual Meeting and World Conference on Industrial Applications of Electrical Energy (Cat. No. 00CH37129), pp. 2376-2382 (Oct. 8-12, 2000) (Abstract).

Office Action issued in connection with corresponding EP Application No. 16000107.9 dated Nov. 16, 2018 (English Translation Unavailable).

\* cited by examiner

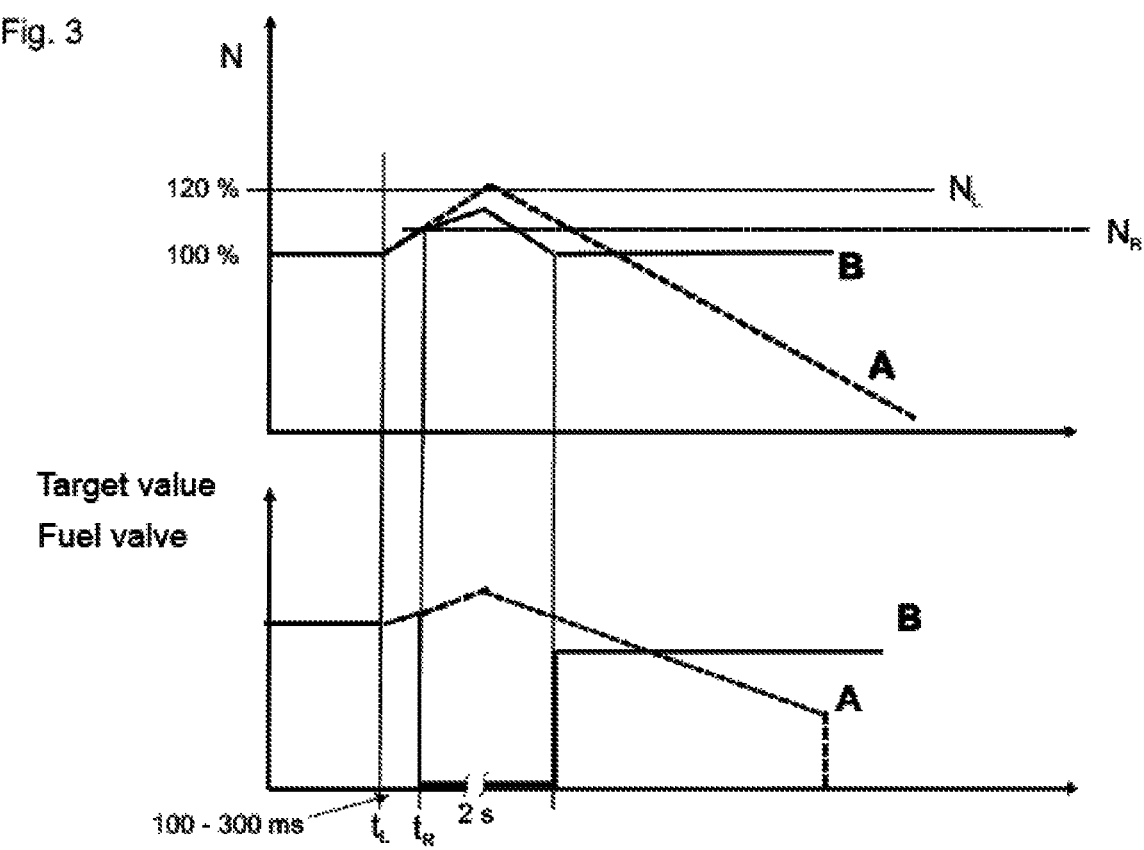

ARRANGEMENT WITH ROTATING DRIVE MACHINE AND OPERATING METHOD

The present invention relates to a method for operating an arrangement comprising a rotating drive machine as well as an arrangement comprising a rotating drive machine and a control unit for controlling and/or regulating the arrangement.

In WO 2010/134994 A1, an arrangement of a combustion engine and a generator driven thereby is described. In this regard, the signals of different sensors on the combustion engine and on the generator are supplied to a control unit.

If a change of the power output by the arrangement now occurs, this initially leads to a change of the rotational speed of the combustion engine, which can subsequently lead to phase and frequency shifts on the generator. The electrical consumers supplied by the arrangement have to be able to compensate for this. In practice, it is therefore normally the case that the arrangement is open and/or closed loop controlled such that a rotation of a rotor of the generator exhibits a rotational speed which is as constant as possible.

If such a change of the power take occurs in the case of the arrangement proposed in WO 2010/134994 A1, a changed state of the arrangement is detected. The control unit, as a result, changes the regulation or the control such that the actual values of the parameter present at the arrangement again correspond to the target values suitable for the stationary operation of the arrangement.

Unfortunately the response of the control unit and of the arrangement proves as a whole to be relatively slow such that the consumers supplied have to contest with the already mentioned frequency and phase shifts.

Naturally, this problem increases the greater the change of the power decrease. If the buyer of the arrangement is not a public electricity network, but, purely for example, provided by a number of pumps, the shutdown of a part of the pumps may cause power changes of more than 50% of the nominal power. It is clear that load shedding of this magnitude presents great challenges for the arrangements known in the prior art if the requirements are defined such that no complete shutdown of the arrangement or unacceptably large changes in frequency or phase should occur.

The object of the invention is thus to provide a method which allows a stable operation of the arrangement even in the case of large load shedding. A device for carrying out a method of this type should also be provided. With regard to the method, this object is achieved by the features of claim 1. With regard to the device, this object is achieved by the features of claim 13.

This occurs by a value characteristic of a change of a power output of the arrangement being provided by measuring at least one parameter and/or calculation and
- the rotating drive machine (2) is open and/or closed loop controlled in dependence on the value characteristic of the change of the power output of the arrangement and/or
- a load of the rotating drive machine (2) is changed in dependence on the value characteristic of the change of the power output of the arrangement such that the change of the power output of the arrangement is substantially compensated.

One aspect of the invention consists in that a quicker response is possible to the changed power take by providing a value characteristic of a change of a power output of the arrangement. In particular it is possible to set the target value for the control and regulation of the arrangement more quickly such that they correspond to the power decrease following the load shedding. This enables a clearly quicker response than the stepwise tracking of the target values as a mere function of the state of the rotating drive machine.

It is, however, also possible to change the load of the rotating drive machine such that the change of the power output is compensated. In order to achieve this, braking resistors, mechanical brakes or storage structures can, for example be used, which remove energy either directly at the driven shaft or on the electrical side of the generator.

A device according to the invention can be used not only to provide electrical energy for a (public) energy supply network, but also to supply a few consumers in a closed environment (so-called "island operation").

The open and/or closed loop control can take into consideration that in the case of load changes non-trivial torsions (bending), for example of the crankshaft occur, whereby energy is briefly stored in the system and then released again. This can lead to the amount of the load change value being underestimated since at first a slightly delayed response, for example in the measurement values of a rotational speed sensor, arrives.

Further advantageous embodiments of the invention are defined in the dependent claims.

Different elements of the rotating drive machine can be open and/or closed loop controlled in dependence on the value characteristic of the change of the power output of the arrangement and both independently of each other as well as in combination. Examples are a fuel valve and/or a throttle valve. An ignition time can also be changed as a function of the value characteristic of the change of the power output of the arrangement. It is also possible to suspend an ignition at least of one cylinder of the rotating drive machine as a function of the value characteristic of the change of the power output of the arrangement. The different mentioned measures have different advantages and disadvantages.

For example, the suspension of the ignition indeed exhibits a very quick effect, however it can lead to uncontrolled combustions in the exhaust tract (deflagrations and similar) since unburnt fuel can get into the exhaust tract. The control or the regulation of the fuel valve, on the other hand, requires somewhat longer timescales, however it exhibits a more disadvantageous effect in stabilising the power output of the rotating drive machine to a new level.

The use of a throttle valve as an actuator is characterised by a delayed response to the control or regulation, which is caused by the amount of gas already in the distribution chamber. After this delay, the throttle valve, however, provides very strong open and/or closed loop control effects. Similarly, this applies to bypass valves (also: bypass) possibly present on a turbo charger or waste gate (in each case circumventing the compressor or the turbine).

The shifting of the ignition time, however, has an almost instant effect by changing the combustion efficiency. The regulation effect is however relatively small such that it is, in particular for large load shedding, not sufficient to change only the ignition time.

It can be particularly preferred for a load change value to be used for the value characteristic of the change of the power output of the arrangement. It is hereby possible to set target values of the motor regulation particularly quickly, such that they are well suited for reaching or maintaining a new power level. In particular, this allows many parameters of the arrangement to be pre-controlled.

The value characteristic of the change of the power output of the arrangement can be provided in different ways. In one particularly preferred embodiment, it can be provided for a parameter characteristic of a rotation of a shaft driven by the rotating drive machine to be measured and the value characteristic of the change of the power output of the arrangement to be calculated from the measured parameter. The parameter characteristic of the rotation of the shaft driven by the rotating drive machine can, for example be a rotational speed and/or an angular speed of the driven shaft. A load change value can then be calculated by means of the formula, $$\Delta P = J\omega \frac{d\omega}{dt}$$

wherein ω denotes the angular speed of the driven shaft. J denotes the moment of inertia of all rotating masses of the arrangement together with the moment of inertia which develops through the resistance of further moving parts (rods, pistons, etc.).

The parameter characteristic of the rotation of the shaft driven by the rotating drive machine can be measured at different points. In one particularly preferred embodiment, this occurs at a crankshaft of the rotating drive machine, wherein it is also of course possible to measure this parameter for example at the generator.

Moreover, it can be particularly preferably provided for a measurement signal from measuring the parameter characteristic of the rotation of the shaft driven by the rotating drive machine to be filtered preferably by means of a bandpass filter. For example noise of the sensor produced by vibrations can be hereby filtered out, which allows a more accurate determination of the value characteristic of the change of the power output of the arrangement.

It can be provided for an electrical generator to be driven by means of the rotating drive machine.

The rotating drive machine can be particularly preferably designed as a combustion engine, in particular a (preferably mixed-charged) gas engine. The invention can, however, also be readily used in the case of, for example steam turbines and similar.

Further advantages and details of the invention emerge by way of the figures as well as the associated figure description. In this regard, they show:

FIG. 1 a schematic depiction of a device according to the invention

Figure 2:
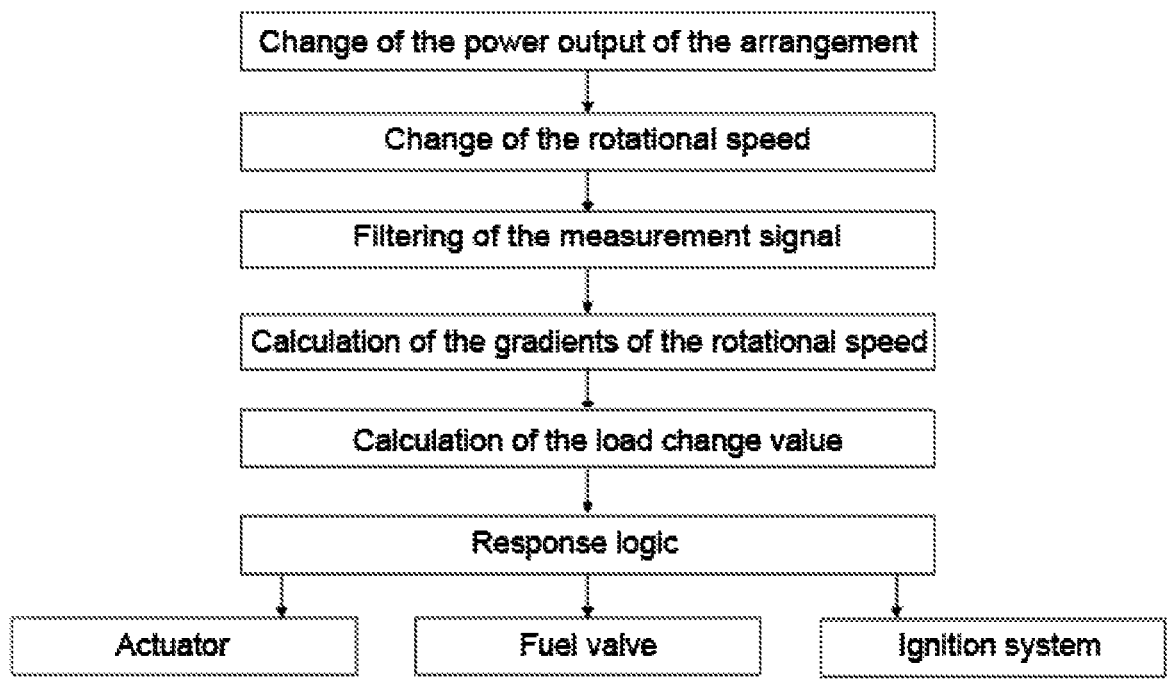

FIG. 2 a flow diagram of a method according to the invention and

FIG. 3 two diagrams for regulating or controlling a fuel valve.

The arrangement 1 according to the invention depicted in FIG. 1 comprises a combustion engine 2, in this case a gas engine, which drives a generator 7. In this configuration, the arrangement is denoted as a Genset.

The combustion engine 2 has a plurality of cylinders 5. In this exemplary embodiment, eight cylinders 5 are specifically depicted, wherein the exact number of cylinders is not significant for the present invention. It can be used, in particular for a cylinder number of 8 to 24.

The combustion engine 2 has a fuel source T and a fuel valve 3. Fuel T and air L are supplied via this valve to a mixing device 14. The mixture produced is supplied to cylinders 5 via a throttle valve 4. The crankshaft 6 driven by cylinders 5 in turn drives a rotor of the generator 7. The electrical energy provided in the generator 7 is supplied to one or a plurality of consumers 15.

A sensor 11 is positioned on the crankshaft 6 or on the rotating unit, which measures the rotational speed N in this exemplary embodiment. The measurement signals are initially supplied via an input interface 10 to a control unit 9. The measurement signal is initially filtered by means of a filter 8, in this case a bandpass filter, and supplied to a calculation unit 12. The calculation unit 12 calculates the load change value ΔP according to the formula, $$\Delta P = J\omega \frac{d\omega}{dt}$$

wherein ω is the angular speed calculated from the filtered measurement signal N_filt and J denotes the effective moment of inertia of all rotating or moving masses ( $$\left(\frac{d}{dt}\right.$$

of course denotes the temporal derivative).

In case the arrangement cannot be represented with only one mass system, this must be calculated with an expansion through the combination of a plurality of moments of inertia and angular speeds.

The load change value is supplied to an open and/or closed loop control unit 13, 10 which takes different measures as a function of the load change value ΔP. To this end, the open and/or closed loop control unit 13 is connected with the fuel valve 3, the throttle valve 4 and optionally with a braking resistor 16 (load bank), which is downstream of the generator 7.

Alternatively or additionally, different actuators can be used to open and/or closed loop control, for example, the load pressure. Examples are a bypass value or a so-called waste gate. The first allows a partial air flow to circumvent a compressor of a turbo charger. The second functions analogously to a turbine of a turbo charger.

FIG. 2 shows a flow diagram of an exemplary embodiment of a method according to the invention. Following a change of the power output of the arrangement, the rotating drive machine reacts with a change of the rotational speed. This is measured and filtered. The gradient of the change of rotational speed can be calculated from the filtered measurement signal. With the help of the same, a load change value can be determined. This is supplied to a response logic which takes different measures as a function of the load change value. Examples of the measures would be the open and/or closed loop control of the throttle valve and/or a (main) fuel valve. Alternatively or additionally, actions of the ignition system can be changed and/or further measures taken.

In the case of a high power reduction (load shedding), the fuel valve can be immediately closed and remain closed for a time (100 ms to 5 s) depending on the degree of the power change, the rotational power or other operational parameters (e.g. rotational speed curve).

Regulating elements for influencing the load pressure (in FIG. 2 abbreviated as "actuators") can also be used for open and/or closed loop control. These would be, for example, the already mentioned throttle valves, bypass valves or waste gates. The throttle valve can, for example be set to a position, which corresponds to the new power level present after the load change.

In FIG. 3, a comparison between a method of the prior art and a method according to the invention is lastly presented by way of two diagrams. In the top diagram of FIG. 3, the rotational speed of the rotating drive machine is depicted, in the bottom diagram the target value for a fuel valve. The two values are plotted there against time in each case. At a time $t_L$, a change of the power output of the arrangement occurs, in this case a reduced power output. The rotational speed of the rotating drive machine is thereby increased.

In this example, it is assumed that the mixture composition remains constant, whereby due to the increased rotational speed and the mixture quantity increased thereby, a short-term increase of the fuel quantity can take place.

Through the relatively quick response time, the response time $t_R$ is relatively close to the time $t_L$ of the change of the load output (around 100 to 300 ms in this exemplary embodiment). In the case of a relatively large load shedding, the fuel supply can be immediately closed, as can be seen in the bottom diagram of the figure. The duration of the shutdown is around 2 s in this special example.

This is the situation for the approach according to the invention, illustrated by the curves B in FIG. 3.

For an approach according to the prior art (curves A in FIG. 3), a limit value $N_L$ is predetermined. As soon as the rotational speed reaches this limit value, different measures can be taken (in this example a safety-related shutdown of the machine). Due to residual fuel still present in the supply system of the rotating drive machine, the rotational speed still increases for a short time, but then falls again. As soon as the rotational speed is again close to the desired rotational speed, the fuel supply can be turned on again.

As is visible from the diagram, this limit value $N_L$ is further from the target value for the rotational speed than the rotational speed $N_R$, for which a response can take place according to the invention. A more robust operation of the rotating drive machine is thus provided.

The invention claimed is:

1. A method for operating an arrangement comprising a load driven by a rotating drive machine having an internal combustion engine with a plurality of cylinders, the method comprising:
    providing a load change value (ΔP) which is characteristic of a change in a power output of the arrangement by measuring at least one parameter and/or performing a calculation;
    selecting at least one measure from a plurality of different measures for controlling the at least one load or the rotating drive machine as a function of the load change value (ΔP), wherein the at least one measure being selected is different as the load change value (ΔP) changes; and
    controlling at least one of the load or the rotating drive machine of the arrangement with the at least one measure being selected such that the change in the power output of the arrangement is substantially compensated, wherein the plurality of different measures comprises at least one of:
        controlling a bypass of air to circumvent a compressor of a turbocharger of the rotating drive machine; or
        shutting off a fuel supply to the rotating drive machine for a duration of time during operation of the rotating drive machine; or
        changing the load with a braking resistor comprising a load bank.

2. The method according to claim 1, wherein the plurality of different measures comprises controlling the bypass of the air to circumvent the compressor of the turbocharger of the rotating drive machine.

3. The method according to claim 1, wherein the plurality of different measures comprises shutting off the fuel supply to the rotating drive machine for the duration of time during the operation of the rotating drive machine.

4. The method according to claim 1, wherein the plurality of different measures comprises suspending an ignition in one or more cylinders, but less than all of the plurality of cylinders of the internal combustion engine, during operation of the rotating drive machine.

5. The method according to claim 1, wherein the plurality of different measures comprises controlling the bypass of the air to circumvent the compressor of the turbocharger of the rotating drive machine, and wherein the plurality of different measures comprises shutting off the fuel supply to the rotating drive machine for the duration of time during the operation of the rotating drive machine.

6. The method according to claim 1, wherein providing the load change value (ΔP) comprises measuring at least one parameter comprising a rotational speed and/or an angular speed of a shaft driven by the rotating drive machine.

7. The method according to claim 6, wherein providing the load change value (ΔP) comprises performing the calculation of the load change value (ΔP) using a formula, $$\Delta P = J\omega \frac{d\omega}{dt}$$

wherein J denotes an effective moment of inertia from inputs of all moved masses and ω denotes the angular speed of the driven shaft.

8. The method according to claim 6, wherein the rotational speed and/or the angular speed of the shaft driven by the rotating drive machine is measured at a crankshaft of the rotating drive machine.

9. The method according to claim 6, wherein a measurement signal is filtered from the measuring of the rotational speed and/or the angular speed of the shaft driven by the rotating drive machine by a low-pass filter.

10. The method according to claim 1, wherein the plurality of different measures comprises changing the load with the braking resistor comprising the load bank.

11. An arrangement comprising the rotating drive machine and a control unit for closed loop controlling of the arrangement with the at least one measure, operated according to claim 1, wherein the control unit has an input interface where the load change value (ΔP) which is characteristic of the change in the power output of the arrangement and/or the at least one parameter is transmittable, wherein the load change value (ΔP) of the change in the power output of the arrangement is calculated from the at least one parameter, and in that the control unit is designed to closed loop control at least one of the load or the rotating drive machine with the at least one measure being selected such that the change of the power output of the arrangement is substantially compensated.

12. The arrangement according to claim 11, comprising a sensor connected to the control unit for measuring the at least one parameter, wherein the at least one parameter comprises the rotation of a shaft driven by the rotating drive machine, wherein the control unit is configured to calculate the load change value (ΔP) of the change in the power output of the arrangement from a temporal change of the rotation of the driven shaft measured by the sensor.

13. The arrangement according to claim 11, comprising the load, wherein the load comprises an electrical generator driven by the rotating drive machine.

14. A method, comprising:
   measuring a speed of rotation of an arrangement having an electrical generator driven by an internal combustion engine having one or more cylinders;
   calculating a load change value ($\Delta P$) based on a change in the measured speed of rotation, wherein the load change value ($\Delta P$) is characteristic of a change in a power output of the electrical generator;
   selecting at least one measure from a plurality of different measures for controlling the arrangement as a function of the load change value ($\Delta P$), wherein the at least one measure being selected is different as the load change value ($\Delta P$) changes; and
   controlling the arrangement with the at least one measure being selected to compensate for the change in the power output to reduce frequency shifts or phase shifts in the power output.

15. The method of claim 14, wherein the plurality of different measures comprises controlling a bypass of air to circumvent a compressor of a turbocharger of the internal combustion engine.

16. The method of claim 14, wherein the plurality of different measures comprises shutting off a fuel supply to the internal combustion engine for a duration of time during operation of the internal combustion engine.

17. The method of claim 14, wherein the plurality of different measures comprises changing a load on the internal combustion engine with a braking resistor having a load bank electrically coupled to the electrical generator.

18. A system, comprising:
   a control unit configured to:
      measure a speed of rotation of an arrangement having an electrical generator driven by an internal combustion engine having one or more cylinders;
      calculate a load change value ($\Delta P$) based on a change in the measured speed of rotation, wherein the load change value ($\Delta P$) is characteristic of a change in a power output of the electrical generator;
      select at least one measure from a plurality of different measures for controlling the arrangement as a function of the load change value ($\Delta P$), wherein the at least one measure being selected is different as the load change value ($\Delta P$) changes; and
      control the arrangement with the at least one measure being selected to compensate for the change in the power output to reduce frequency shifts or phase shifts in the power output.

19. The system of claim 18, comprising the internal combustion engine.

20. The system of claim 18, comprising the electrical generator.

* * * * *